United States Patent
Tsubokura et al.

(10) Patent No.: US 7,408,599 B2
(45) Date of Patent: Aug. 5, 2008

(54) BACKLIGHT ASSEMBLY COMPRISING A SUPPORT MEMBER CORRESPONDING TO A HOLE IN A PRINTED CIRCUIT BOARD AND DISPLAY DEVICE HAVING THE SAME

(75) Inventors: Masaki Tsubokura, Mobara (JP); Shimon Itakura, Mobara (JP)

(73) Assignee: Hitachi Displays, Ltd., Mobara-Shi (JP)

( * ) Notice: Subject to any disclaimer, the term of this patent is extended or adjusted under 35 U.S.C. 154(b) by 276 days.

(21) Appl. No.: 11/410,139

(22) Filed: Apr. 25, 2006

(65) Prior Publication Data
US 2006/0244891 A1 Nov. 2, 2006

(30) Foreign Application Priority Data
Apr. 27, 2005 (JP) .............. 2005-130006

(51) Int. Cl.
*G02F 1/1333* (2006.01)
(52) U.S. Cl. .................................. 349/58; 349/64
(58) Field of Classification Search ............ 349/58, 349/64, 70
See application file for complete search history.

(56) References Cited

U.S. PATENT DOCUMENTS

| 7,213,937 B2* | 5/2007 | Tsai ..................... 362/224 |
|---|---|---|
| 7,325,937 B2* | 2/2008 | Aoki et al. .................. 362/97 |
| 2004/0179151 A1* | 9/2004 | Lee .............................. 349/58 |
| 2005/0225992 A1 | 10/2005 | Idei et al. |
| 2006/0104080 A1* | 5/2006 | Kim et al. .................... 362/555 |
| 2006/0146512 A1* | 7/2006 | Choi .......................... 362/29 |

FOREIGN PATENT DOCUMENTS

| JP | 07-064084 | 3/1995 |
|---|---|---|
| JP | 2003-346541 | 12/2003 |
| JP | 2004-144910 | 5/2004 |

* cited by examiner

*Primary Examiner*—Andrew Schechter
*Assistant Examiner*—Charles Chang
(74) *Attorney, Agent, or Firm*—Antonelli, Terry, Stout & Kraus, LLP.

(57) ABSTRACT

A display device includes a reflector having a flat bottom surface. A leg portion of a support member which supports a light diffusion plate is mounted on the reflector in an erected manner in a state that the leg portion is allowed to pass through a through hole formed in the reflector and a through hole formed in a housing. Further, in fixing a printed circuit board on a back surface side of the housing, when the leg portion is present in the inside of a region of the back surface side of the housing to which the printed circuit board is fixed, a through hole is formed in a region of the printed circuit board which is overlapped to the leg portion, and the leg portion is allowed to pass through the through hole.

8 Claims, 5 Drawing Sheets

BACKLIGHT ASSEMBLY COMPRISING A SUPPORT MEMBER CORRESPONDING TO A HOLE IN A PRINTED CIRCUIT BOARD AND DISPLAY DEVICE HAVING THE SAME

CLAIM OF PRIORITY

The present application claims priority from Japanese application serial No. 2005-130006, filed on (Apr. 27, 2005), the content of which is hereby incorporated by reference into this application.

BACKGROUND OF THE INVENTION

1. Field of the Invention

The present invention relates to a display device, and more particularly to a technique which is effectively applicable to a display device which includes a direct backlight unit.

2. Description of Related Art

Conventionally, as a display device, there has been known a device which displays an image or a video using light from a light source such as a liquid crystal display device, for example. In the liquid crystal display device, on a back side of a liquid crystal panel which fills a liquid crystal material between a TFT panel on which TFT elements are arranged in an array and a counter substrate, a light source (a backlight unit) is mounted.

The backlight unit is a unit (a member) which radiates light to a whole surface of the liquid crystal panel after converting light from a linear light source such as a cold cathode fluorescent tube or the like, for example, into a planar light, wherein the backlight unit is classified into a direct backlight unit and an edge-light backlight unit.

In the direct backlight unit, for example, the fluorescent tube is arranged right below the liquid crystal panel. In such a backlight unit, for example, a reflector is arranged in the inside of a box-like housing (a frame), and one or a plurality of fluorescent tubes are arranged above the reflector. Further, above the fluorescent tube, an optical sheet and a light diffusion plate are arranged.

The direct backlight unit is, in general, used in a liquid crystal display device or the like which is required to exhibit high luminance. For example, the direct backlight unit is used as a light source of a display device such as a liquid crystal display for a PC (a personal computer), a liquid crystal television receiver set or the like.

Further, with respect to the liquid crystal display or the liquid crystal television receiver set, recently, the large sizing of the display panel is in progress and hence, the light diffusion plate which is mounted on the backlight unit becomes also large-sized. Accordingly, when the light diffusion plate is supported on the housing in a state that end portions of the light diffusion plate are brought into contact with the housing, the light diffusion plate is deflected and hence, a uniformity ratio of luminance is lowered. Accordingly, recently, for example, there has been proposed a backlight unit in which a support member is arranged in the inside of the housing and the light diffusion plate is supported on the support member thus preventing the deflection of the light diffusion plate and enhancing the uniformity ratio of luminance (for example, see Japanese Patent Laid-open Hei7(1995)-64084).

In the backlight (illumination device) which is described in the above-mentioned document, on an inner bottom surface of a reflector which corresponds to the above-mentioned housing, a transparent support member which supports an optical member such as a light control sheet (a diffusion plate) or the like on an inner surface of the sheet is mounted in an elected manner.

SUMMARY OF THE INVENTION

In the backlight (the illumination device) described in the above-mentioned document, on a widthwise-directional intermediate portion of the bottom surface of the reflector and between a pair of fluorescent lamps, an auxiliary reflecting portion which projects inwardly in a crest shape is integrally and continuously mounted. Further, a portion of the auxiliary reflecting portion is formed into a flat surface and the support member is mounted on the flat surface in an erected manner.

In mounting the support member on the reflector in an erected manner, usually, as described in the above-mentioned patent document 1, a leg portion (a fixing portion) of the support member is made to pass through a through hole formed in the reflector so as to fix the support member, wherein the leg portion projects from a back surface side of the reflector. Accordingly, as in the case of the backlight described in the patent document 1, when a portion of the crest-shape auxiliary reflecting portion is formed into the flat surface and the support member is mounted in an erected manner, it is possible to prevent a thickness of the backlight from being increased by an amount corresponding to the projection of the leg portion.

However, when the crest-like auxiliary reflecting portion and the flat surface are formed on the bottom surface of the reflecting portion as in the case of the reflecting portion of the backlight described in the Patent Document 1, for example, there may arise a drawback that the reflecting portion is liable to be easily twisted or deflected thus lowering the uniformity ratio of the reflection light.

Further, when the crest-like auxiliary reflecting portion and the flat surface are formed on the bottom surface of the reflecting portion, in addition to the twisting and the deflecting of the backlight portion, there may arise irregularities with respect to a distance (a height) to the flat surface from the bottom surface. As a result, the diffusion plate which is supported on the support member which is erected on the flat surface is deflected and hence, there may arise a drawback that the uniformity ratio of luminance is lowered by an amount corresponding to the deflection of the diffusion plate.

One advantage of the present invention to provide a technique which can prevent the lowering of a uniformity ratio of luminance in a display device using a direct backlight unit which supports a light diffusion plate using a support member arranged in the inside of a housing.

The above-mentioned and other advantages and novel features of the present invention will become apparent based on the description of this specification and attached drawings.

The present invention is directed to a display device in which the display device includes a direct backlight unit which mounts a reflector having a flat bottom surface on a housing (a lower frame), and includes a support member which supports a light defusing plate on the reflector, and fixes a printed circuit board (a circuit board) on a back surface of the housing, and support member has a leg portion which projects from a back surface side of the housing through a through hole formed in a bottom surface of the reflector and a bottom surface of the housing, the leg portion of the support member projects into the inside of a region where the printed circuit board is fixed, and a through hole which allows the leg portion to pass through is formed in a region of the printed circuit board where the printed circuit board is overlapped to the leg portion.

Further, to explain typical examples of the display device of the present invention, they are as follows.

(1) A display device which includes a reflector, a plurality of light sources which are arranged over the reflector, an optical member which is arranged over the plurality of light sources, and a display panel which is arranged over the optical member, the reflector has a flat bottom surface which is contiguously extended under the plurality of light sources, the display device includes a support member which has one end thereof arranged in a downwardly projecting manner from the flat bottom surface and another end thereof arranged to face the optical member in an opposed manner, a printed circuit board is arranged below the reflector, and a hole is formed in a region of the printed circuit board which corresponds to the projecting one end of the support member.

(2) A display device which is, on the premise of the example (1), a distance between the printed circuit board and the reflector is smaller than a downward projecting height of the support member from the reflector.

(3) A display device which is, on the premise of the example (1), a downward projecting position of the support member from the reflector is held at a position above a thickest part of the printed circuit board.

(4) A display device which is, on the premise of the example (1), a plurality of holes which correspond to the support members is formed in the printed circuit board, and the holes are arranged to be asymmetrical with respect to the center of the printed circuit board.

(5) A display device which is, on the premise of any one of the examples (1) to (4), the projecting one end of the support member forms a leg portion for fixing.

(6) A display device which is, on the premise of the example (5), a pawl (a fold-back portion) which prevents a removal of the support member is formed on a portion of the leg portion of the support member which projects downwardly from the reflector.

(7) A display device which is, on the premise of the example (5), the leg portion of the support member is formed in a leaf spring shape.

In the display device of the present invention, with the provision of the reflector having the flat bottom surface, the twisting, the deflection, and the distortion of the reflector can be reduced and hence, it is possible to enhance a uniformity ratio of luminance of light radiated from a backlight unit.

Further, by forming the hole which allows the leg portion of the support member to pass therethrough in the circuit board (the printed circuit board), it is possible to set a distance from an opening end closer to the housing out of opening ends of the hole formed in the printed circuit board to the bottom surface of the housing smaller than a projecting height of the leg portion of the support member from the back surface of the housing. Further, by setting the projecting height of the leg portion of the support member from the back surface of the housing smaller than a thickness of the printed circuit board, it is possible to prevent the increase of a thickness of the display device which occurs when the leg portion of the support member projects from the back surface of the housing.

Further, by forming the pawl (the fold-back portion) on the portion of the leg portion of the support member which projects from the bottom surface of the housing, it is possible to prevent the removal of the support member. Further, in place of forming the pawl (the fold-back portion) on the leg portion of the support member, the leg portion may be formed in the leaf spring shape.

Further, the display panel may be formed of any panel provided that the panel can display an image or a video by controlling the transmission and the interruption of light radiated from the backlight unit. For example, as the display panel, a liquid crystal display panel including a TFT panel which forms TFT elements on a transparent substrate in an array can be used.

DETAILED DESCRIPTION

Hereinafter, the present invention is explained in detail in conjunction with embodiments by reference to drawings.

Here, in all drawings for explaining the embodiments, parts having identical functions are given same symbols and their repeated explanation is omitted.

In a display device according to the present invention, with the provision of a reflector having a flat bottom surface, the twisting, the deflection, and the distortion of the reflector can be reduced and hence, it is possible to enhance a uniformity ratio of luminance of light radiated from a backlight unit.

Here, a leg portion of a support member for supporting an optical member such as a light diffusion plate or the like which is formed on the reflector is allowed to project toward a back surface side of a housing in a state that the leg portion passes through a through hole formed in a bottom surface of the reflector and a bottom surface of a housing which mounts the reflector thereon. Further, when the leg portion of the support member projects into the inside of a region on the back surface of the housing where a printed circuit board (a circuit board) is fixed, the through hole which allows the leg portion to pass there through is formed in a region of the printed circuit board which is overlapped to the leg portion thus preventing the increase of a thickness of the display device.

Figure 1:
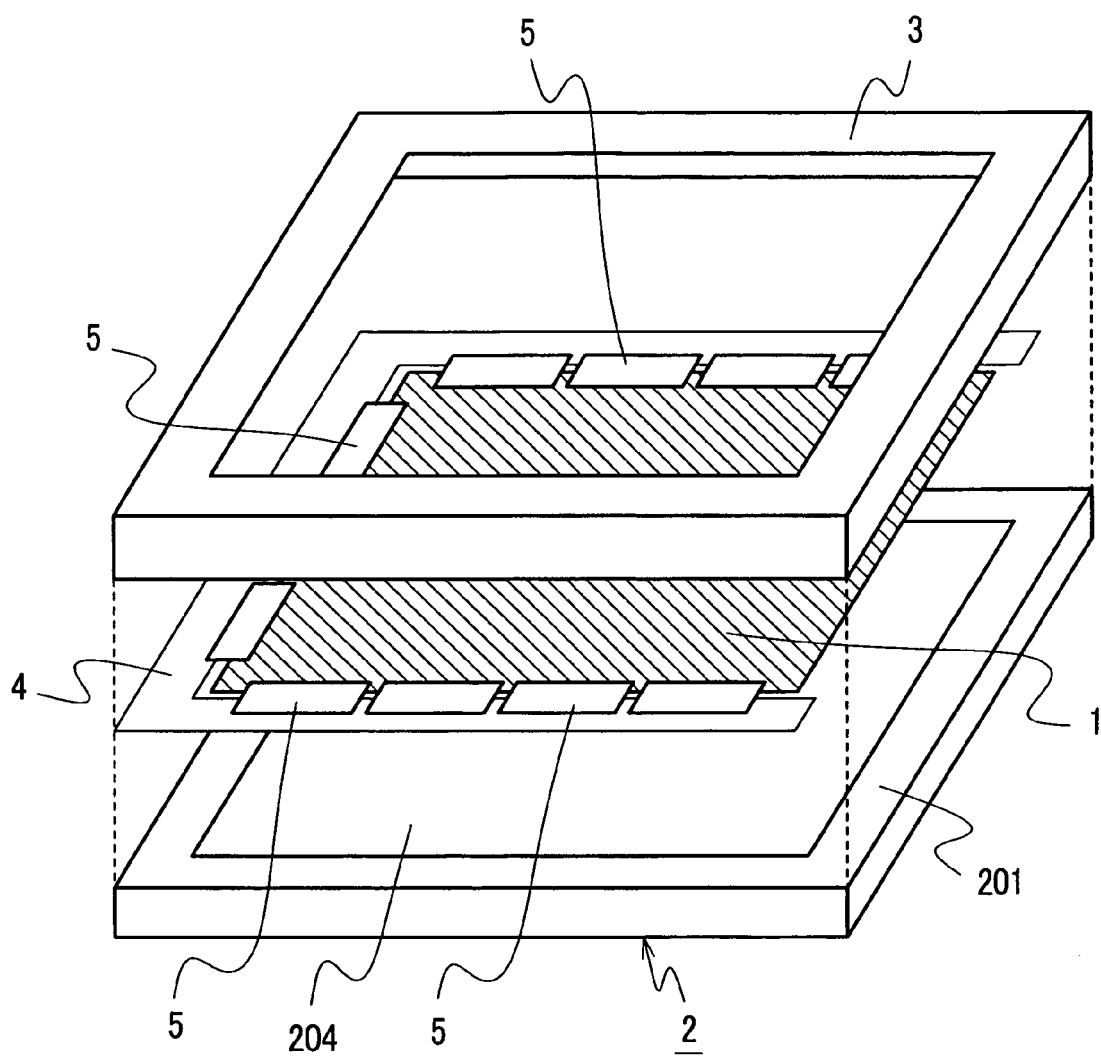
FIG. 1 is a schematic view showing the schematic constitution of a display device of one embodiment according to the present invention and also is a perspective view for explaining one example of the whole constitution of the display device.
Figure 2:
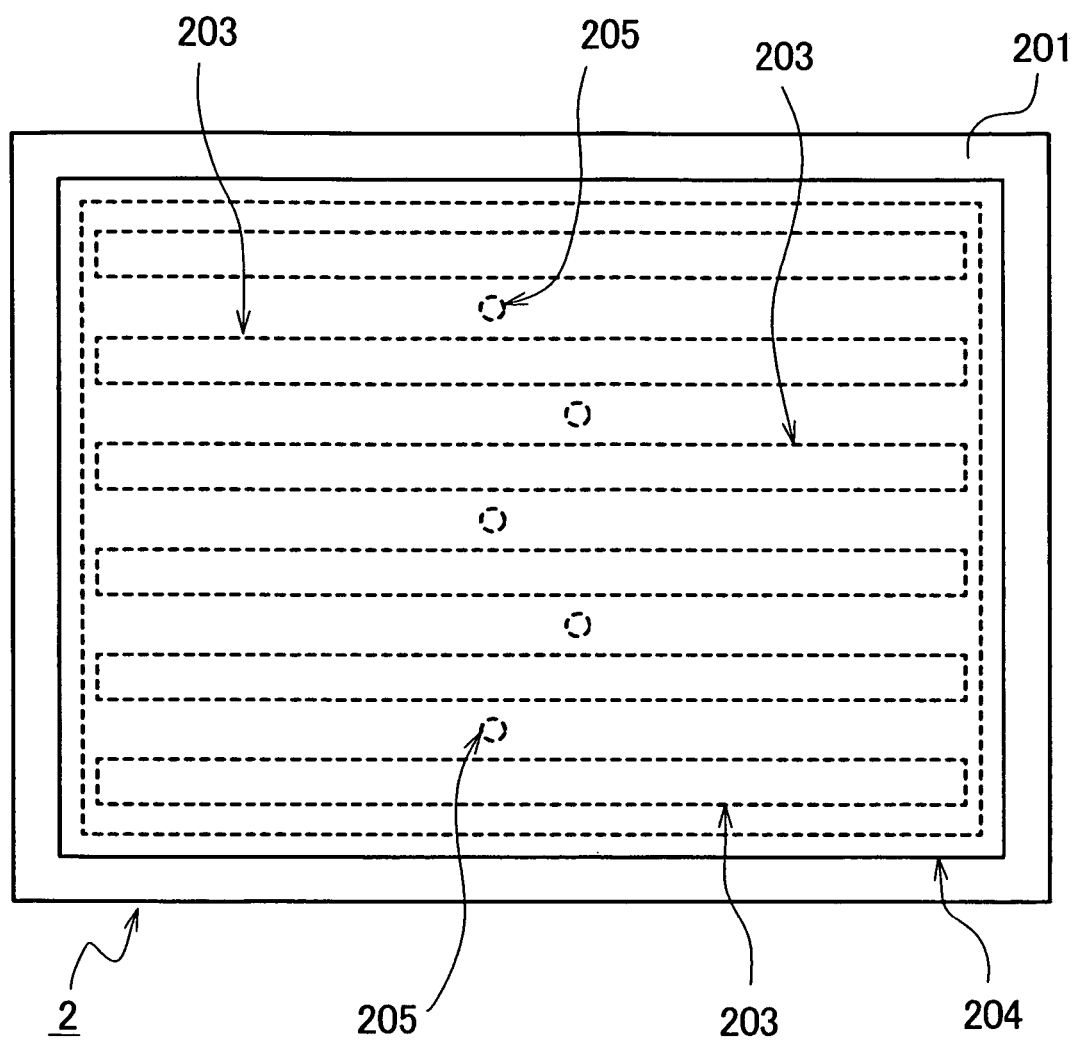
FIG. 2 is a schematic view showing the schematic constitution of the display device of one embodiment according to the present invention and also is a plan view of a backlight unit used in this embodiment from a light radiation surface side.
Figure 3:
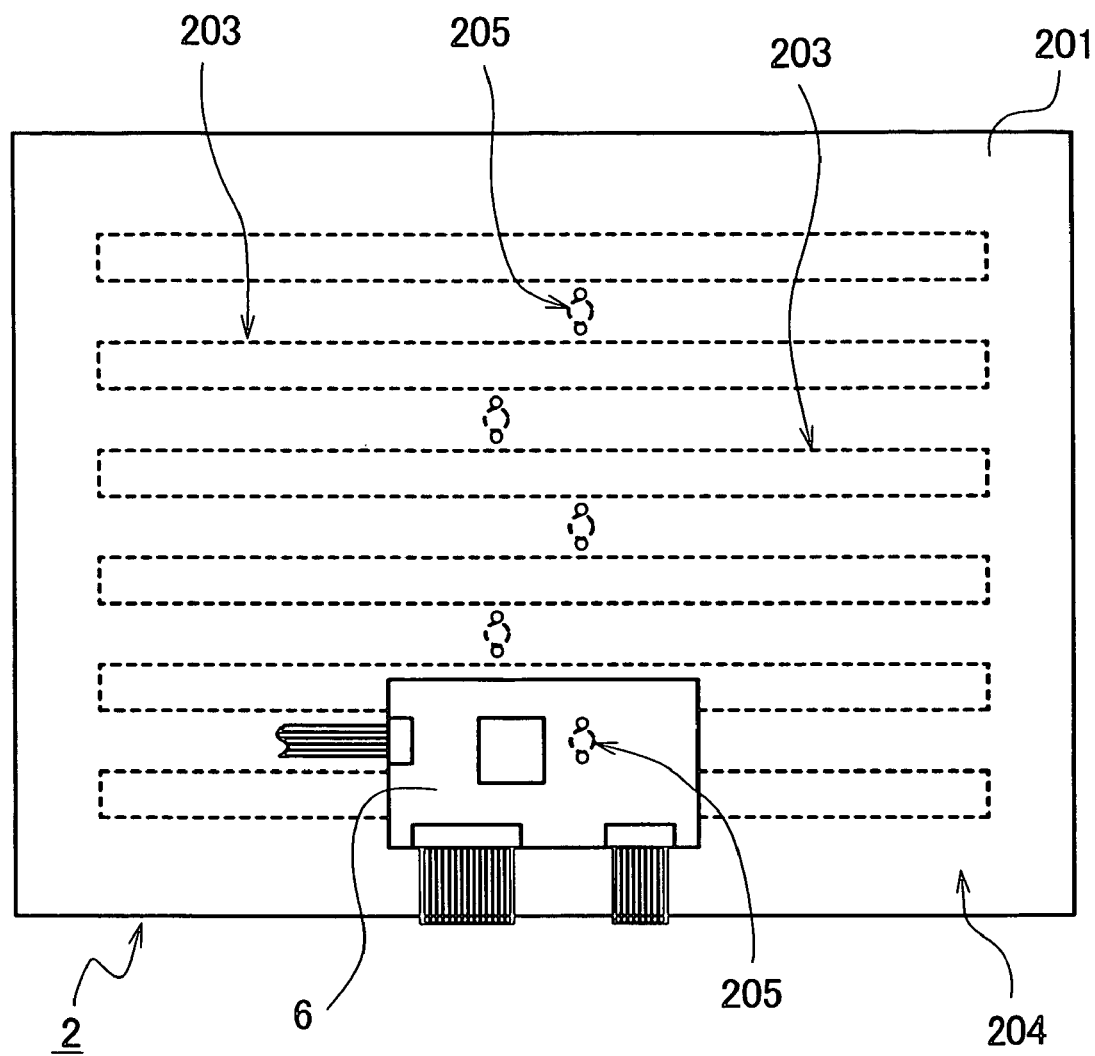
FIG. 3 is a schematic view showing the schematic constitution of the display device of one embodiment according to the present invention and also is a back view of FIG. 2.
Figure 4:
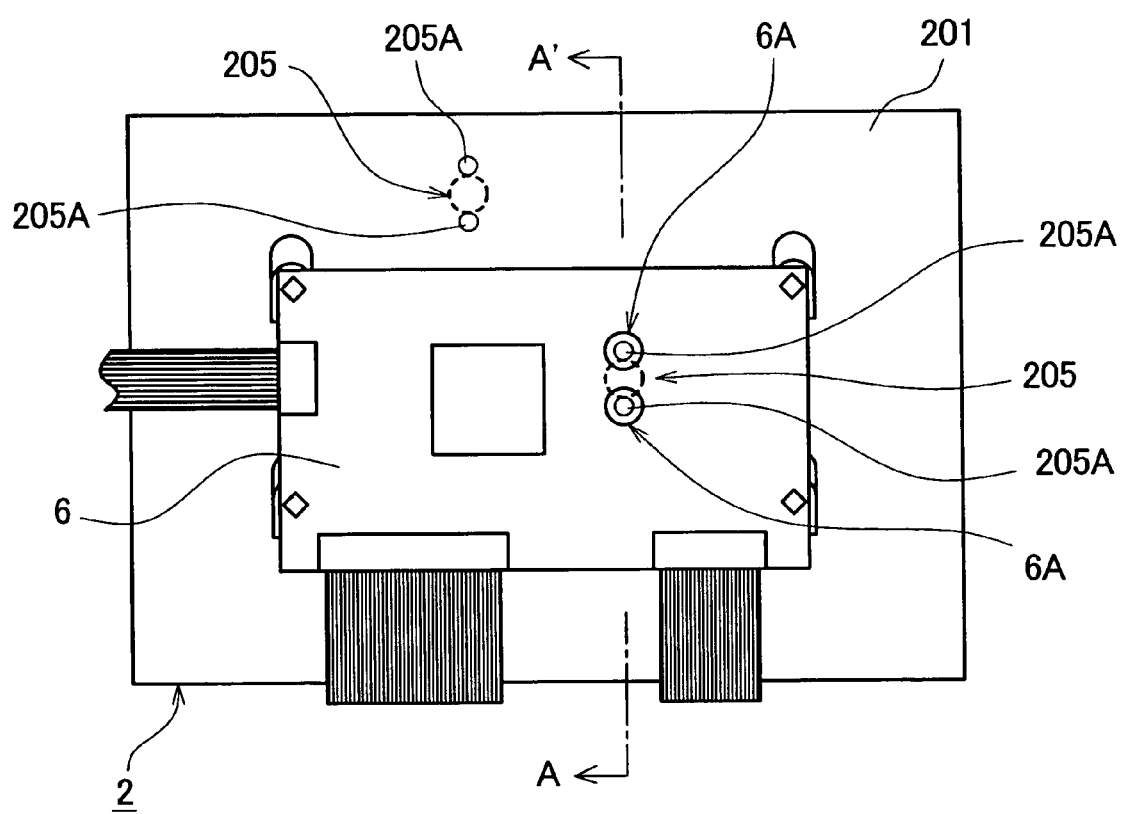
FIG. 4 is a schematic view showing the schematic constitution of the display device of one embodiment according to the present invention and also is an enlarged view of a periphery of a printed circuit board shown in FIG. 3.
Figure 5:
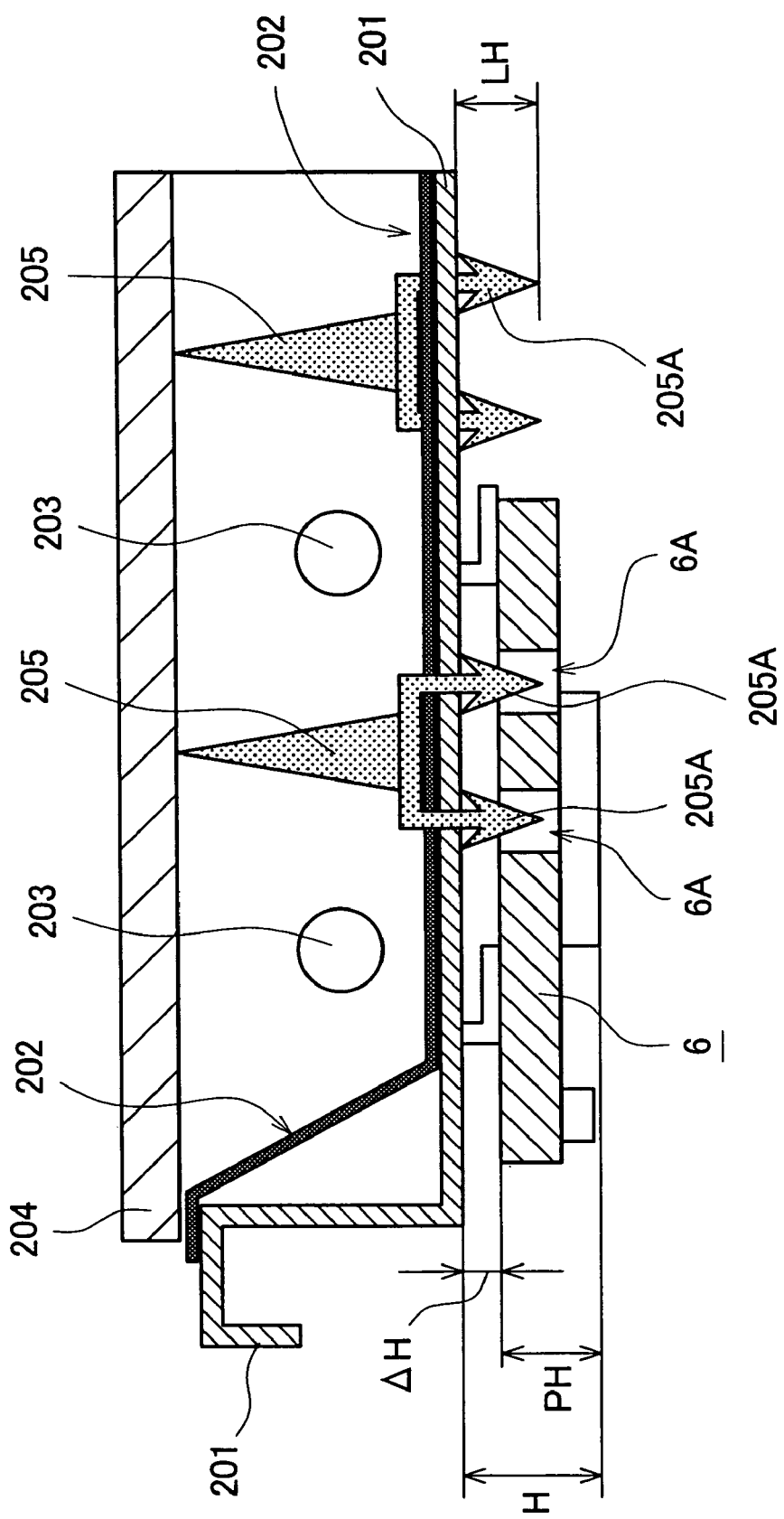
FIG. 5 is a schematic view showing the schematic constitution of the display device of one embodiment according to the present invention and also is a cross-sectional view taken along a line A-A' in FIG. 4.

FIG. 1 to FIG. 5 are schematic views showing the schematic constitution of the display device of one embodiment according to the present invention, wherein FIG. 1 is a perspective view for explaining one example of the whole constitution of the display device, FIG. 2 is a plan view of a backlight unit used in this embodiment from a light radiation surface side, FIG. 3 is a back view of FIG. 2, FIG. 4 is an enlarged view of a periphery of a printed circuit board shown in FIG. 3, and FIG. 5 is a cross-sectional view taken along a line A-A' in FIG. 4.

In FIG. 1, numeral 1 indicates a display panel, numeral 2 indicates a direct backlight unit, numeral 3 indicates a frame member, numeral 4 indicates a printed circuit board, and numeral 5 indicates liquid crystal driver ICs. Further, in FIG. 2 to FIG. 5, numeral 201 indicates a housing (a lower frame), numeral 202 indicates a reflector, numeral 203 indicates fluorescent lamps, numeral 204 indicates a light diffusion plate, numeral 205 indicates support members, numeral 205A indicates leg portions of the support members 205, numeral 6 indicates a printed circuit board, and numeral 6A indicates through holes formed in the printed circuit board 6.

The display device of this embodiment is a display device which includes a direct backlight unit and includes, for example, as shown in FIG. 1, the display panel 1 which includes elements for controlling the transmission and the interruption of light, the above-mentioned direct backlight unit 2, and the frame member 3 which integrally holds the display panel 1 and the direct backlight unit 2 in an overlapped manner.

Here, the display panel 1 is, for example, a liquid crystal display panel which fills a liquid crystal material between a TFT substrate which mounts TFT elements on a transparent substrate such as a glass substrate in an array and a counter substrate which is mounted over the TFT substrate. Here, the printed circuit board (printed board) 4 is formed on an outer peripheral portion of the display panel, and lines on the printed circuit board 4 and lines on the display panel 1 are connected with each other via the liquid crystal driver ICs 5. Here, in the display device of this embodiment, the display panel 1 is not limited to the above-mentioned display panel and may have any constitution provided that the display panel 1 is a panel which is used in a display device which requires a conventional backlight unit.

Further, although the illustration is omitted in FIG. 1, the printed circuit board 4 is connected with other printed circuit boards.

Further, the direct backlight unit 2 includes, for example, as shown in FIG. 2 to FIG. 5, the housing (the lower frame) 201, the reflector 202 which is arranged in the inside of the housing 201 and has a flat bottom surface, the fluorescent lamps 203 which are arranged above the reflector 202, the light diffusion plate 204 which is arranged above the fluorescent lamps 203, and the support members 205 which are arranged above the reflector 202.

The reflector 202 is provided for introducing light emitted from the fluorescent lamp 203 toward the light diffusion plate 204 by reflecting the light, wherein as shown in FIG. 5, the reflector 202 has the flat bottom surface which continuously extends over a plurality of light sources and has end portions thereof folded in the predetermined directions of the light diffusion plate 204. The reflector 202 having such a flat bottom surface hardly generates the twisting, the deflection or distortion thereof compared to the reflector having the crest-like auxiliary reflecting portion as described in the above-mentioned patent document 1 (see Japanese Patent Laid-open Hei7(1995)-64084). Accordingly, it is possible to increase a uniformity of ratio of luminance of the reflection light.

The fluorescent lamps 203 are, for example, formed of a linear light source such as a cold cathode fluorescent tube (CFL) or the like, wherein as shown in FIG. 2 or FIG. 3, a plurality of fluorescent tubes are arranged in parallel to each other. Here, the fluorescent tubes are not limited to the constitution and the arrangement shown in FIG. 2 or FIG. 3 and, for example, one or a plurality of U-shaped fluorescent tubes or W-shaped fluorescent tubes may be arranged. Further, the fluorescent lamps 203 are not limited to the cold cathode fluorescent tube and may be, for example, formed of a hot cathode fluorescent tube.

The light diffusion plate 204 is provided for converting a linear light emitted from the fluorescent lamps 203 into a planar light, and any material and constitution may be used to form the light diffusion plate 204 so long as the light diffusion plate 204 is formed of a light diffusion plate which is used in a conventional direct backlight unit. Further, although omitted from FIG. 5, a lighting control plate is formed on an inner surface of the diffusion plate 204, that is, on a surface of the light diffusion plate 204 which faces the reflector 202.

The support members 205 are members which are provided for preventing the deflection of the light diffusion plate 204 or the deflection of the light diffusion plate 204 and the lighting control plate, wherein for example, as shown in FIG. 5, leg portions 205A are formed on one end of each support member 205. Further, the support member 205 is mounted on the reflector 202 in an erected manner in a state that the leg portions 205A are inserted into through holes (not shown in the drawing) which are formed in the bottom surface of the reflector 202 and the bottom surface of the housing 201, and the support member 205 supports the light diffusion plate 204 or the lighting control plate with a distal end (another end) of the support member 205. Here, provided that the bottom surface of the reflector 202 is flat, the twisting, the deflection or the distortion of the reflector 202 is hardly generated and hence, the irregularities of the height of the support member 205 are reduced. Accordingly, when the light diffusion plate 204 or the lighting control plate is supported on the support member 205, the deflection of the light diffusion plate 204 or the lighting control plate is hardly generated. Accordingly, it is possible to increase the uniformity ratio of luminance of light radiated to the display panel 1.

Here, although the leg portions 205A of the support member 205 may be formed in a columnar or prism-like rod shape, as shown in FIG. 5, a pawl (a fold-back portion) may be formed on a portion of the leg portion 205A which projects from the bottom surfaces of the reflector 202 and the housing 201 and hence, it is possible to prevent the removal of the support member 205. Further, the leg portion 205A may be formed in a leaf spring shape in place of forming the pawl (or the fold-back portion) on the leg portion 205A so as to prevent the removal of the support member 205 by making use of a repulsive force of the leaf-spring-shaped leg portion.

Further, in the display device of this embodiment, in general, as shown in FIG. 3 to FIG. 5, to a back surface of the housing (the lower frame) 201 of the backlight unit, for example, a printed circuit board (a circuit board) 6 which includes control circuits such as a timing controller and the like are fixed. The printed circuit board 6 is connected with, for example, a circuit which controls lighting and extinction of the fluorescent lamps and the printed circuit board 4 which is arranged on an outer peripheral portion of the display panel 1.

The printed circuit board 6 is, in general, fixed at any position provided that the printed circuit board 6 is fixed to the back surface of the housing 201. However, by arranging the printed circuit board 6 in the vicinity of the center of the certain side of the housing 201, it is possible to transmit a signal uniformly to the left and the right of the side. Further, it is preferable to provide a large number of support members 205 to prevent the deflection of the light diffusion plate 204 or the lighting control plate. However, the provision of the large number of support members 205 increases a weight of the display device and the uniformity ratio of light is lowered due to the transmission of light through the support member 205 and hence, the printed circuit board 6 is supported with a small number of support members 205 efficiently in general. Accordingly, it is preferable to position the support members 205 as shown in FIG. 2 and FIG. 3.

However, when the position where the support members 205 are provided and a region in which the printed circuit board 6 is fixed are determined from the above-mentioned view point, for example, as shown in FIG. 3 to FIG. 5, the leg portions 205A of the support member 205 project into the inside of the region where the printed circuit board 6 is fixed. Here, assume that a conventional printed circuit board is fixed, the printed circuit board must be fixed at a height which prevents the printed circuit board from coming into contact with the leg portions 205A of the support members 205. Accordingly, the thickness of the display device is increased.

Accordingly, in the display device of this embodiment, as shown in FIG. 4 and FIG. 5, in a region of the circuit board such as the printed circuit board 6 which is overlapped to a downward projecting portion, for example, the leg portion 205A, the through hole 6A which allows the leg portion 205A to pass therethrough is formed. Due to such a constitution, with respect to an opening end of the through hole 6A formed in the printed circuit board 6, it is possible to set a distance ΔH to the printed circuit board 6 from the reflector 202 or the housing 201 smaller than a projecting height LH of the leg portion 205A of the support member 205 from the back surface of the reflector 202 or the housing 201. Further, in this case, as shown in FIG. 5, by setting the projecting height LH of the leg portion 205A of the support member 205 from the back surface of the housing 201 smaller than a thickness PH of the printed circuit board 6 (including a thickness of parts mounted below the printed circuit board) and a mounting height H of the printed circuit board 6, there is no possibility that the leg portion 205A projects from the printed circuit board 6. Accordingly, it is possible to prevent the increase of the thickness of the display device.

As has been explained heretofore, according to the display device of this embodiment, with the provision of the reflector 202 having the continuously flat bottom surface extending over the plurality of light sources, the twisting, the deflection and the distortion of the reflector 202 are hardly generated whereby the uniformity ratio of reflection light can be enhanced.

Further, since the twisting, the deflection and the distortion of the reflector 202 are hardly generated, the deflection of the light diffusion plate 204 and the lighting control plate which are supported on the support members 205 which are mounted on the reflector 202 in an erected manner is hardly generated and hence, the uniformity ratio of luminance of the light radiated to the display panel 1 can be enhanced. Here, it is possible to obtain the above-mentioned advantageous effects also with respect to any optical members which are supported by the support members 205 including, for example, the diffusion plate, a focusing plate, a transparent plate and the like.

Further, when the leg portions 205A of the support member 205 are allowed to project toward the back surface side of the housing 201 through the through holes formed in the reflector 202 and the housing 201, the projecting portions pass through the through holes 6A formed in the printed circuit board 6 and hence, it is possible to prevent the increase of the thickness of the display device. Further, when the display device is assembled such that, for example, the support members 205 are fixed to the reflector 202 firstly and, thereafter, the printed circuit board (circuit board) 6 is fixed to the lower portion of the reflector 202 in this order, the portions (the leg portions 205A) of the support members 205 project below the reflector 202. Accordingly, it is possible to easily determine the fixing position of the printed circuit board 6. Further, since the through holes 6A are formed in the printed circuit board 6 corresponding to the leg portions 205A of the support member 205, the printed circuit board 6 may be arranged by aligning the through holes 6A to the projecting leg portions 205A of the support members 205 thus providing the structure which can ensure the operational efficiency of assembling. Further, in arranging the plurality of holes in the printed circuit board (circuit board) 6, by arranging these holes in an asymmetrical manner with respect to the center of the circuit board, the arrangement direction of the circuit board 6 is univocally determined at the time of assembling the display device whereby errors in mounting can be obviated in advance.

Although the present invention has been specifically explained in conjunction with the embodiment, it is needless to say that the present invention is not limited to the above-mentioned embodiment and various modifications are conceivable without departing from the gist of the present invention.

What is claimed is:

1. A display device comprising:
   a reflector;
   a plurality of light sources which are arranged over the reflector;
   an optical member which is arranged over the plurality of light sources; and
   a display panel which is arranged over the optical member, wherein
   the reflector has a flat bottom surface which is contiguously extended under the plurality of light sources,
   the display device includes a support member which has one end thereof arranged in a downwardly projecting manner from the flat bottom surface and another end thereof arranged to face the optical member in an opposed manner,
   a printed circuit board is arranged below the reflector, and
   a hole is formed in a region of the printed circuit board which corresponds to the projecting one end of the support member.

2. A display device according to claim 1, wherein a distance between the printed circuit board and the reflector is smaller than a downward projecting height of the support member from the reflector.

3. A display device according to claim 1, wherein a downward projecting position of the support member from the reflector is at a position above a thickest part of the printed circuit board.

4. A display device according to claim 1, wherein a plurality of holes which correspond to the support members are formed in the printed circuit board, and the holes are arranged to be asymmetrical with respect to the center of the printed circuit board.

5. A display device according to claim 1, wherein the projecting one end of the support member forms a leg portion for fixing.

6. A display device according to claim 5, wherein a pawl which prevents a removal of the support member is formed on a portion of the leg portion of the support member which projects downwardly from the reflector.

7. A display device according to claim 5, wherein the leg portion of the support member is formed in a leaf spring shape.

8. A display device according to claim 5, wherein the display panel is a liquid crystal display panel.

* * * * *